US012069385B2

United States Patent
Jung et al.

(10) Patent No.: US 12,069,385 B2
(45) Date of Patent: Aug. 20, 2024

(54) ELECTRONIC DEVICE AND IMAGE BINNING METHOD THEREOF

(71) Applicant: SAMSUNG ELECTRONICS CO., LTD., Suwon-si (KR)

(72) Inventors: Jae Jin Jung, Hwaseong-si (KR); Seung Jin Lee, Gyeonggi-do (KR); Kwi Sung Yoo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 257 days.

(21) Appl. No.: 17/342,912

(22) Filed: Jun. 9, 2021

(65) Prior Publication Data

US 2022/0094862 A1  Mar. 24, 2022

(30) Foreign Application Priority Data

Sep. 21, 2020  (KR) .................. 10-2020-0121451

(51) Int. Cl.
*H04N 25/46* (2023.01)
*H04N 23/84* (2023.01)
*H04N 25/772* (2023.01)

(52) U.S. Cl.
CPC ............. *H04N 25/46* (2023.01); *H04N 23/84* (2023.01); *H04N 25/772* (2023.01)

(58) Field of Classification Search
CPC ....... H04N 23/84; H04N 25/46; H04N 25/772
See application file for complete search history.

(56) References Cited

U.S. PATENT DOCUMENTS

| | | | |
|---|---|---|---|
| 7,667,169 B2 | 2/2010 | Yang et al. | |
| 9,532,161 B2 | 12/2016 | Raleigh | |
| 9,584,745 B2 | 2/2017 | Ladd | |
| 9,667,891 B2 | 5/2017 | Chae et al. | |
| 9,686,485 B2 | 6/2017 | Agranov et al. | |
| 10,015,414 B2 | 7/2018 | Kim et al. | |
| 10,291,872 B2 | 5/2019 | Kim | |
| 11,223,788 B2 * | 1/2022 | Lee | H04N 23/67 |
| 11,694,745 B1 * | 7/2023 | Zhang | G11C 11/418 |
| | | | 348/294 |
| 2017/0041563 A1 * | 2/2017 | Suzuki | H04N 23/672 |
| 2018/0063456 A1 * | 3/2018 | Lee | H04N 25/76 |
| 2018/0077337 A1 * | 3/2018 | Fujii | H04N 25/445 |
| 2019/0182449 A1 | 6/2019 | Baek | |

* cited by examiner

Primary Examiner — Antoinette T Spinks
(74) Attorney, Agent, or Firm — F. Chau & Associates, LLC

(57) ABSTRACT

An electronic device includes a pixel array that outputs a raw image including color pixels and specific pixels, a logic circuit that outputs a first binned image by performing first binning on pixels in a row direction for each unit kernel of the raw image, and a processor that outputs a second binned image by performing second binning on the first binned image. When a unit kernel includes at least one of the specific pixels, a column to which the at least one specific pixel belongs is read out at a readout timing different from a readout timing of a column to which none of the specific pixels belong and undergoes the first binning. The second binning combines a third binned image of the column to which none of the specific pixels belong with a fourth binned image of the column to which the at least one specific pixel belongs.

19 Claims, 16 Drawing Sheets

FIG. 2

|   | 0 | 1 | 2 | 3 | 4 | 5 | 6 | 7 |
|---|---|---|---|---|---|---|---|---|
| 0 | Gr | R | Gr | R | Gr | R | Gr | R |
| 1 | B | Gb | L00 | R00 | B | Gb | B | Gb |
| 2 | Gr | R | Gr | R | Gr | R | L10 | R10 |
| 3 | B | Gb | B | Gb | B | Gb | B | Gb |
| 4 | Gr | R | Gr | R | Gr | R | Gr | R |
| 5 | B | Gb | B | Gb | L20 | R20 | B | Gb |
| 6 | L30 | R30 | Gr | R | Gr | R | Gr | R |
| 7 | B | Gb | B | Gb | B | Gb | B | Gb |

ELECTRONIC DEVICE AND IMAGE BINNING METHOD THEREOF

CROSS-REFERENCE TO RELATED APPLICATIONS

This application claims priority under 35 U.S.C. § 119 to Korean Patent Application No. 10-2020-0121451, filed on Sep. 21, 2020 in the Korean Intellectual Property Office, the disclosure of which is incorporated by reference herein in its entirety.

TECHNICAL FIELD

Embodiments of the present disclosure relate to an electronic device, and more particularly, to an electronic device which performs binning on an image.

DISCUSSION OF RELATED ART

A pixel array of an image sensor may include color pixels and phase auto focus (PAF) pixels. PAF may refer to a phase detection auto focus or a phase difference auto focus.

When a raw image sensed by the image sensor is binned, an analog binning method may have a high frame rate, but image quality may be degraded due to the PAF pixels. In contrast, a digital binning method may mitigate degradation of image quality due to consideration of the PAF pixels, however, a frame rate may become slow.

SUMMARY

Aspects of the present disclosure provide an electronic device with an increased frame rate while securing resolution of a binned image.

Aspects of the present disclosure also provide an image binning method of an electronic device with an increased frame rate while securing resolution.

According to an embodiment of the present disclosure, an electronic device includes a pixel array configured to output a raw image including a plurality of color pixels and a plurality of specific pixels, a logic circuit configured to output a first binned image by performing first binning on pixels among the color pixels and the specific pixels in a row direction for each of a plurality of unit kernels of the raw image, and a processor configured to output a second binned image by performing second binning on the first binned image. When a unit kernel among the unit kernels includes at least one of the specific pixels, a column to which the at least one specific pixel belongs is read out at a readout timing different from a readout timing of a column to which none of the specific pixels belong and undergoes the first binning. The second binning combines a third binned image of the column to which none of the specific pixels belong with a fourth binned image of the column to which the at least one specific pixel belongs.

According to an embodiment of the present disclosure, an electronic device includes an image sensor and an application processor. The image sensor includes a pixel array in which a plurality of unit kernels is disposed in a Bayer pattern and which generates a raw image, and a logic circuit configured to access the pixel array, perform first binning on the raw image in a column direction, and output a first binned image. The plurality of unit kernels includes an N×N sub-array including a plurality of same color pixels. N is a natural number equal to two or more. At least one unit kernel among the plurality of unit kernels includes a specific pixel in at least one column. The application processor includes a memory configured to store a first binned color pixel value and a first binned specific pixel value in units of the unit kernel, and a processor configured to output a second binned color pixel value by performing second binning on the first binned color pixel value.

According to an embodiment of the present disclosure, an image binning method of an electronic device includes generating, by an image sensor including a pixel array in which a plurality of unit kernels is arranged in a Bayer pattern, a raw image. The method further includes performing, by the image sensor, first binning on row pixel values in the raw image, which belong to rows which are turned on at readout timings, and outputting first binned pixel values. The method further includes performing, by a processor, second binning on the first binned pixel values in a row direction and outputting second binned pixel values. The plurality of unit kernels includes a plurality of N×N sub-arrays included in a pixel array, N is a natural number equal to two or more, and a readout timing of at least one first column in each of the plurality of unit kernels is different from a second readout timing with respect to a remaining second column.

BRIEF DESCRIPTION OF THE DRAWINGS

The above and other features of the present disclosure will become more apparent by describing in detail embodiments thereof with reference to the accompanying drawings, in which:

FIG. 2 is a diagram illustrating a pixel array according to some embodiments of the present disclosure.

DETAILED DESCRIPTION OF THE EMBODIMENTS

Figure 1:
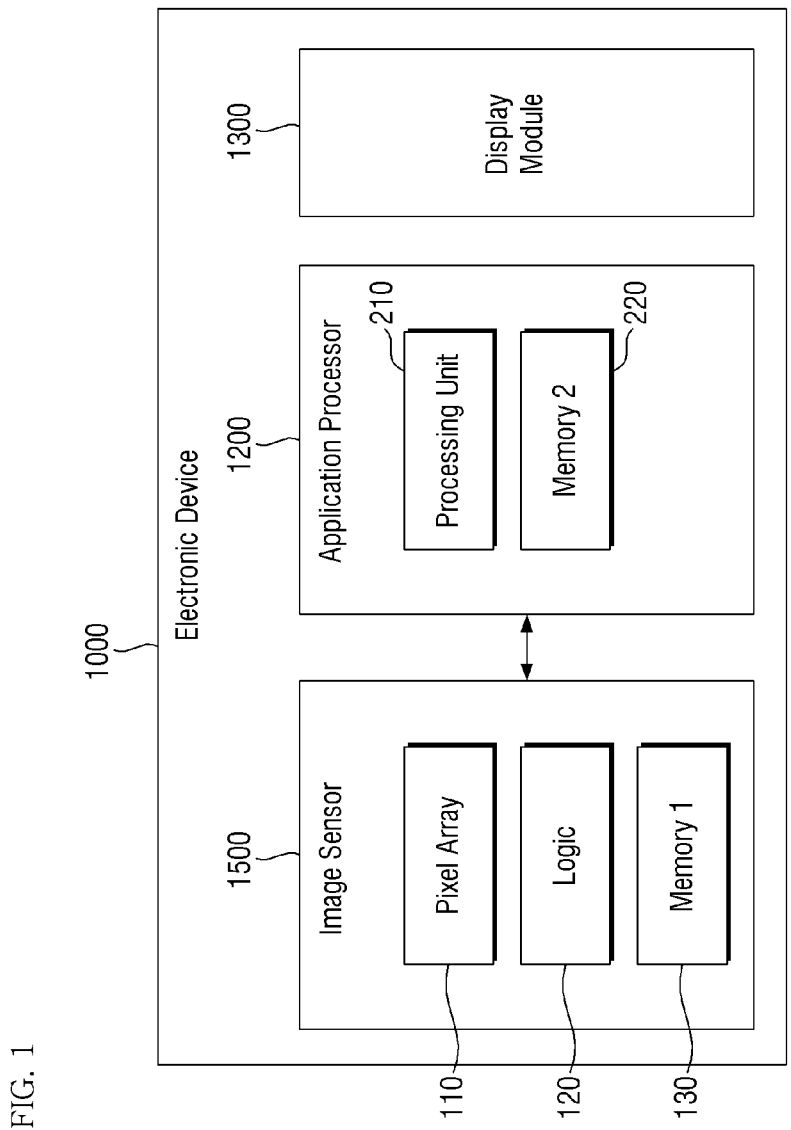
FIG. 1 is a diagram illustrating an electronic device according to some embodiments of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Terms such as "unit," "module," etc., or functional blocks illustrated in the accompanying drawings, may be implemented in the form of hardware, software, or a combination thereof configured to perform a specific function.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

Figure 2:
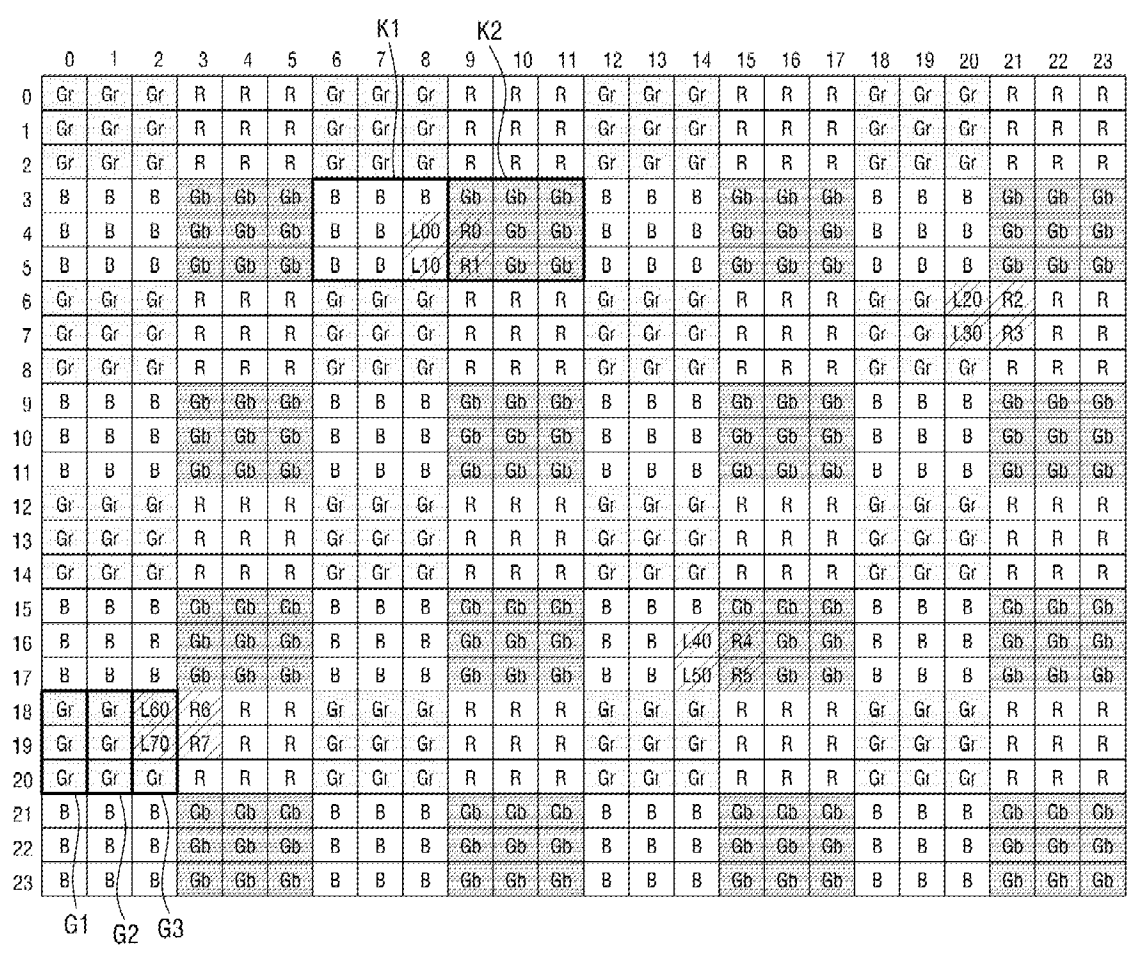
Figures 3, 4:
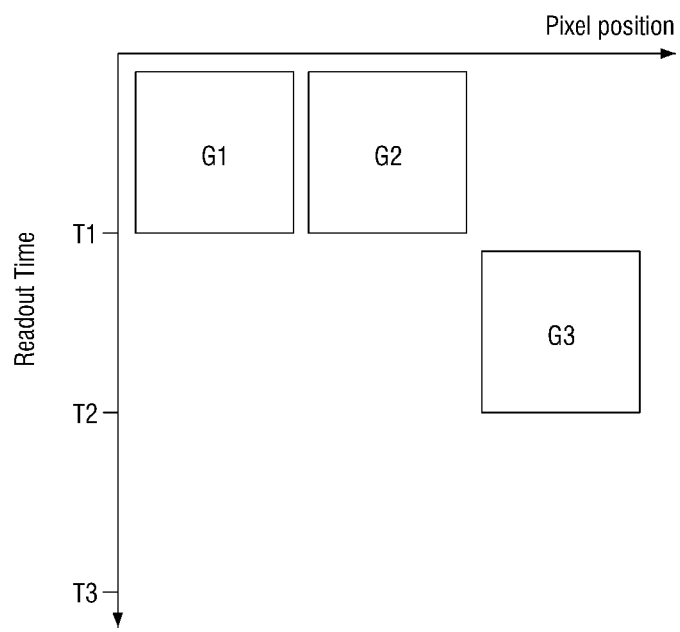
FIG. 3 is a diagram illustrating a final output image undergoing image binning according to some embodiments of the present disclosure.
FIGS. 4 to 6 are diagrams for describing first binning of an electronic device according to some embodiments.

FIG. 1 is a diagram illustrating an electronic device according to some embodiments of the present disclosure. FIG. 2 is a diagram illustrating a pixel array according to some embodiments of the present disclosure. FIG. 3 is a diagram illustrating a final output image undergoing image binning according to some embodiments of the present disclosure.

Referring to FIG. 1, according to some embodiments, an electronic device 1000 may include an image sensor 1500 and an application processor 1200.

The image sensor 1500 may receive light reflected from an object, sense the received light to generate a raw image, and pre-process and output the raw image. For example, the image sensor 1500 may perform first binning on the raw image and output a first binned image.

According to some embodiments, the image sensor 1500 may include a pixel array 110, a logic circuit 120, and a first memory 130.

The pixel array 110 includes a plurality of pixels. According to some embodiments, the pixel array 110 may include a red (R), green (G), blue (B) color pixel array disposed in a Bayer pattern. In addition, according to some embodiments, the pixel array 110 may further include specific pixels. For example, the specific pixels may be pixels for a phase detection auto focus and a phase difference auto focus. A detailed description thereof will be made with reference to FIG. 2.

According to some embodiments, the logic circuit 120 may access the pixel array 110, read out pixel values therefrom, generate a raw image, and perform first binning on the raw image. For example, the first binning may be binning which is performed on a sub-array in a column direction. For example, the first binning may mean binning which is performed in an analog circuit. The logic circuit 120 will be described with reference to FIGS. 7 and 8.

According to some embodiments, the first memory 130 may be a nonvolatile memory and store information necessary for an operation of the image sensor 1500. For example, the first memory 130 may store register values utilized for the operation of the image sensor 1500 and values related to control/commands. According to some embodiments, the first memory 130 may be an operation memory and may include, for example, a cache, a read only memory (ROM), a programmable read only memory (PROM), an erasable programmable read only memory (EPROM), an electrically erasable programmable read only memory (EEPROM), a phase-change random access memory (PRAM), a flash memory, a static random access memory (SRAM), or a dynamic random access memory (DRAM).

The application processor 1200 may perform image processing on the first binned image which is received from the image sensor 1500. According to some embodiments, the application processor 1200 may perform second binning on the first binned image to output a second binned image. For example, as shown in FIG. 3, the second binned image may be an image compressed by a binning operation when compared with the raw image of FIG. 2.

According to some embodiments, the raw image of FIG. 2 may have pixel data of 108M, whereas the final binned image of FIG. 3 may have pixel data of 12M.

According to some embodiments, the application processor 1200 may include a processing unit 210 and a second memory 220.

The processing unit 210 may perform image processing on an image (for example, the first binned image) received from the image sensor 1500. According to some embodiments, the image processing may include the second binning. For example, the second binning may be averaging the first binned image in a row direction. For example, the second binning may mean averaging a first binned pixel value through digital numerical processing.

The second memory 220 may be an operation memory and may temporarily store received data and application information, or may temporarily store a result calculated by the processing unit 210. According to some embodiments, the second memory 220 may store the first binned image received from the image sensor 1500 and then transmit the first binned image such that the processing unit 210 may perform the second binning.

According to embodiments, the second memory 220 may be, for example, a buffer memory. According to some embodiments, the second memory 220 may include, for example, a cache, a ROM, a PROM, an EPROM, an EEPROM, a PRAM, a flash memory, an SRAM, or a DRAM.

In addition, according to some embodiments, the electronic device 1000 may further include a display module 1300, and may receive an image processed by the application processor 1200 and display the received image on the display module 1300.

Figure 5:
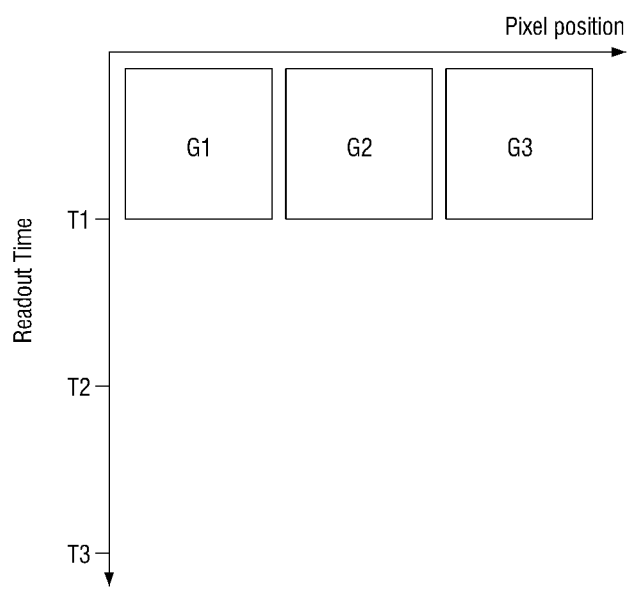
Figure 6:
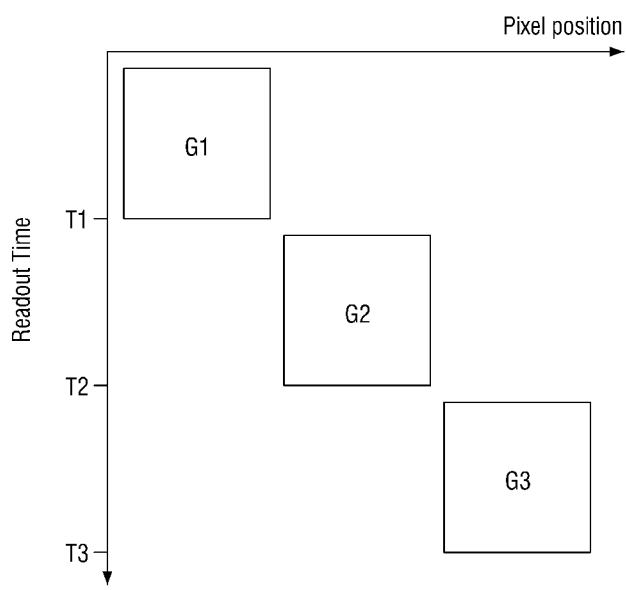

FIGS. 4 to 6 are diagrams for describing first binning of an electronic device according to some embodiments.

Referring to FIGS. 2 to 6, according to some embodiments, the electronic device may generate the binned image of FIG. 3 by performing first binning and second binning on the raw image of FIG. 2.

In FIG. 2, a description will be made on the assumption of a 24×24 pixel array according to some embodiments. The pixel array 110 may include a plurality of unit kernels disposed in a Bayer pattern. Each of unit kernels K1 and K2 may be a set of pixels of the same color and may be an N×N sub-array (N is a natural number of two or more).

In the illustrated embodiment, a case in which the unit kernel is a 3×3 sub-array (N=3) is shown, and the pixel array 110 may include an 8×8 unit kernel. According to an embodiment, each of the unit kernels K1 and K2 may include only the same color pixel, and according to another embodiment, each of the unit kernels K1 and K2 may include the same color pixel and specific pixels.

In the case of unit kernels including specific pixels, each of the unit kernels may include specific pixels facing each other between adjacent unit kernels. According to some embodiments, the unit kernel K1 may include specific pixels L00 and L10 in at least one column Col 8, and the unit kernel K2 may include specific pixels R0 and R1 in at least one column Col 9. The unit kernel K1 and the unit kernel K2 may be adjacent to each other, and the specific pixels may face each other. That is, columns to which the specific pixels belong may be adjacent to each other.

For convenience of description, the unit kernel is described as a 3×3 sub-array. However, embodiments of the present disclosure are not limited thereto. For example, the spirit of the following description is applicable to all N×N sub-arrays, such as a 2×2 sub-array, a 4×4 sub-array, a 5×5 sub-array, etc., where N is a natural number equal to two or more.

According to some embodiments, the pixel array 110 may be enabled in a kernel unit or enabled in units of columns. For convenience of description, a binning operation will be described based on one unit kernel K1 or K2, but this binning operation is generally applicable to even the pixel array 110 including a plurality of unit kernels.

In one embodiment, when the unit kernel is a 3×3 sub-array, the logic circuit 120 may perform first binning on three columns. According to some embodiments, in the unit kernel shown in FIG. 2, the logic circuit 120 may read out columns G1, G2, and G3 in the unit kernel at different timings, read out only at least one column at a different timing, or read out all of the columns G1, G2, and G3 at the same timing.

According to some embodiments, the unit kernel, which is an N×N sub-array, may include N sub-groups corresponding to columns. Referring to FIG. 2, the unit kernel (3×3 sub-array) may include sub-groups G1, G2, and G3. For example, the sub-group G1 may include pixel values of (0,18), (0,19), and (0,20) coordinates corresponding to a column Col 0, the sub-group G2 may include pixel values of (1,18), (1,19), and (1,20) coordinates corresponding to a column Col 1, and the sub-group G3 may include pixel values of (2,18), (2,19), and (2,20) coordinates corresponding to a column Col 2.

Referring to FIGS. 2 and 4, according to some embodiments, the logic circuit 120 may perform first binning on pixels belonging to at least one column and pixels belonging to the remaining columns in the unit kernel at different timings. In the illustrated example, the sub-groups G1 and G2 may be read out at a first timing (0 to T1) to undergo the first binning, and the sub-group G3 may be read out at a second timing (T1 to T2) different from the first timing to undergo the first binning. Alternatively, unlike the illustrated example, the sub-group G1 may be read out and the sub-groups G2 and G3 may be simultaneously read out at a timing different from a read-out timing of the sub-group G1, or the sub-group G2 may be read out and the sub-groups G1 and G3 may be simultaneously read out at a timing different from a read-out timing of the sub-group G2. According to some embodiments, a sub-group which is separately read out from the remaining sub-groups may include specific pixels or include the same color pixels.

The image sensor 1500 may perform the first binning by distinguishing a binning process based on a plurality of color pixels from a binning process based on specific pixels such that the occurrence of an artifact of a final binned image may be reduced. The final binned image of FIG. 3 includes binned specific pixel values based on the specific pixels. That is, even though the raw image is binned, when raw specific pixel values are separately divided from the color pixel and binned, resolution may be improved.

An embodiment of FIG. 4 is applicable to a still image. In the case of the still image, both a frame rate and resolution may be considered, and all pieces of phase information of an object may be considered in the resolution.

Thus, as shown in FIG. 4, the column G3 to which the specific pixels belong may be read out at a timing different from a read-out timing of the columns G1 and G2 to which the specific pixels do not belong, so a G3 binning pixel value may be separately used in subsequent second binning.

Referring to FIGS. 2 and 5, according to some embodiments, the logic circuit 120 may perform first binning on all pixels belonging to columns in the unit kernel at the same timing. In the illustrated example, the sub-groups G1, G2, and G3 may be read out at a first timing (0 to T1) to undergo the first binning. In this case, each of the sub-groups G1, G2, and G3 may include only the same color pixels according to one embodiment or may include at least one specific pixel in the same color pixels according to another embodiment.

The embodiment of FIG. 5 is a case of capturing a change in movement as in a video mode, and is applicable to a case in which frame rate is prioritized over image resolution.

Referring to FIGS. 2 and 6, according to some embodiments, the logic circuit 120 may perform first binning on columns in the unit kernel at different timings. In the illustrated example, the sub-group G1 may be read out at a first timing (0 to T1) to undergo the first binning, the sub-group G2 may be read out at a second timing (T1 to T2) to undergo the first binning, and the sub-group G3 may be read out at a third timing (T2 to T3) to undergo the first binning. In this case, each of the sub-groups G1, G2, and G3 may include only the same color pixels according to one embodiment or may include at least one specific pixel in the same color pixels according to another embodiment.

The embodiment of FIG. 6 is applicable in a still image mode, for example, close-up capturing or night capturing in which ultra-high resolution is desired.

The second binning is performed to bin the first binned image of the unit kernel in the column direction and is performed by the processing unit 210. The second binning may mean averaging the first binned image of the sub-group G1, the first binned image of the sub-group G2, and the first binned image of the sub-group G3.

When a specific pixel belongs to one column among the sub-groups, the processing unit 210 first corrects a column to which the specific pixel belongs to an adjacent color pixel value, and performs the second binning based on the corrected color pixel value and the first binned images of the remaining columns.

For example, in the description with reference to FIGS. 2 and 4, since the specific pixels are included in the column Col 8 in the unit kernel K1, a corrected color pixel value with respect to the column Col 8 is first generated based on adjacent color pixels of the column Col 8 in the unit kernel K1. Then, the second binning is performed on the corrected color pixel value, a first binned color pixel value of a column Col 6, and a first binned color pixel value of a column Col 7. The processing unit 210 combines a second binned color pixel value with the first binned specific pixel value and performs the second binning on the combined value to generate a final binned image as shown in FIG. 3.

Figure 7:
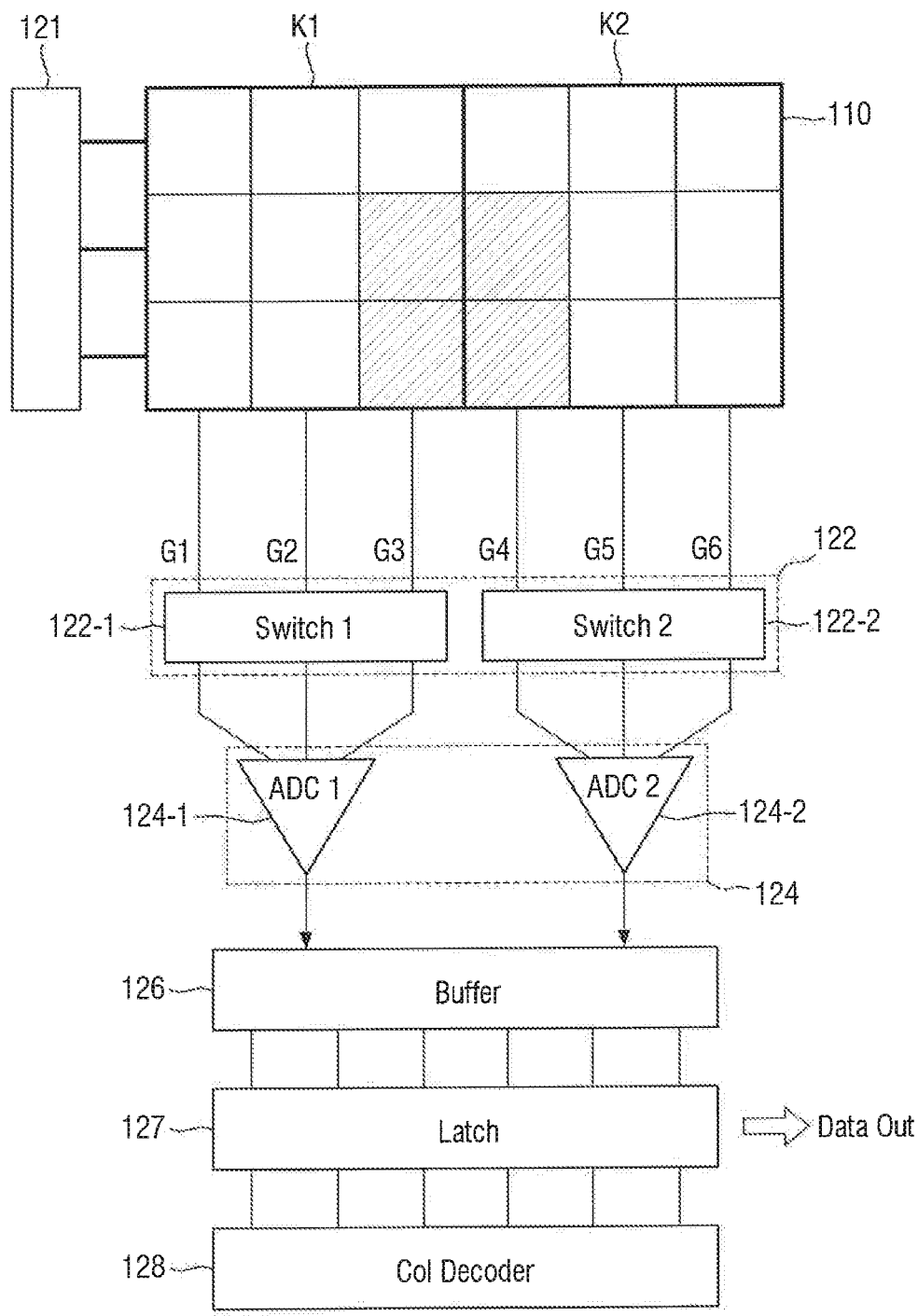
FIGS. 7 and 8 are block diagrams illustrating a pixel array and a logic circuit according to some embodiments.
Figure 8:
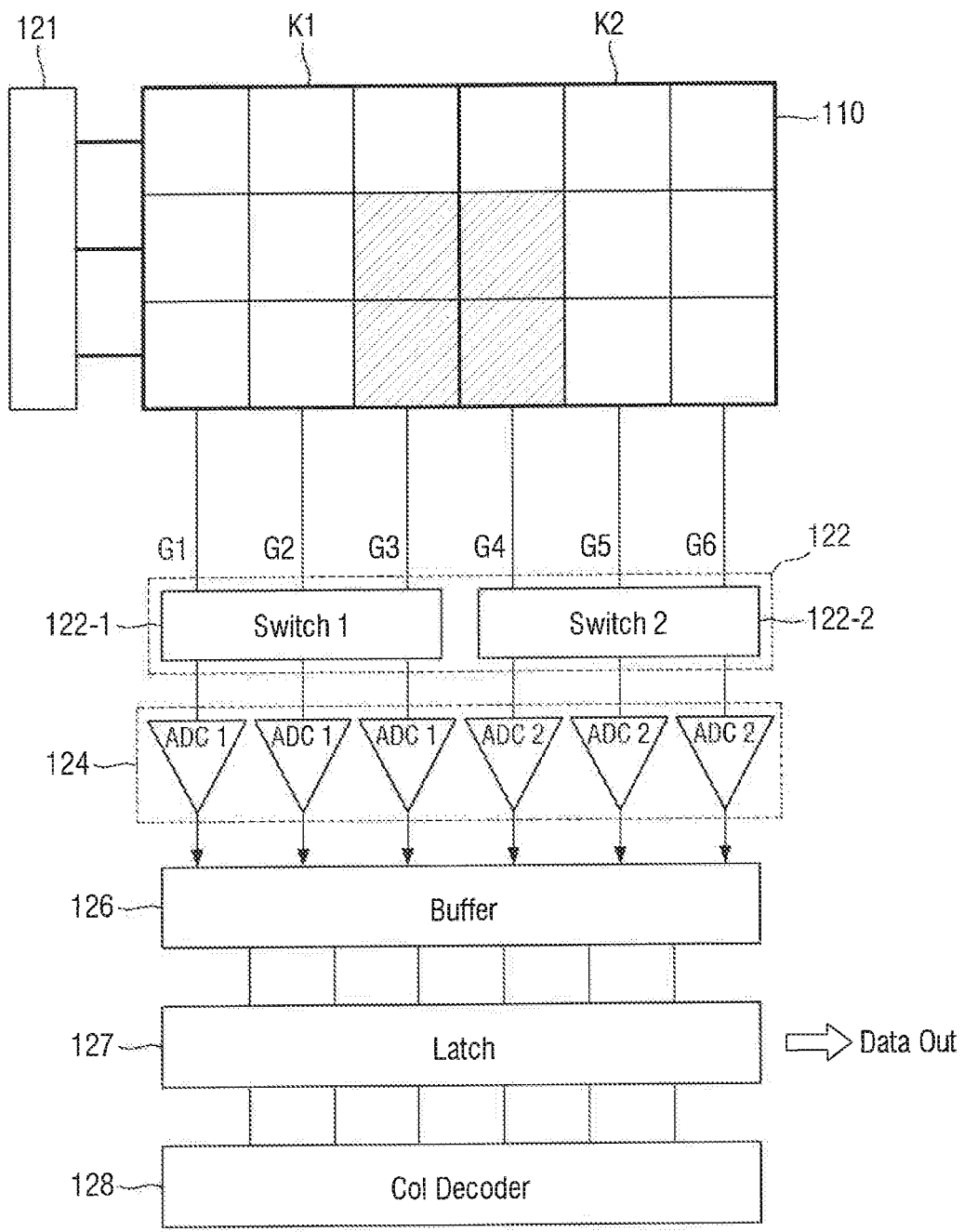
Figures 9, 10A:
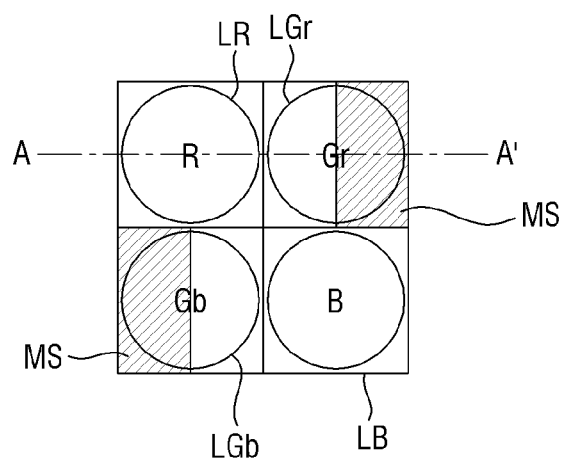
FIG. 9 is a diagram illustrating a data structure of a first binned image output from an image sensor according to some embodiments.
FIGS. 10a to 10c illustrate a pixel structure according to some embodiments.

FIGS. 7 and 8 are block diagrams illustrating a pixel array and a logic circuit according to some embodiments. FIG. 9 is a diagram illustrating a data structure of a first binned image output from an image sensor according to some embodiments.

Referring to FIG. 7, according to some embodiments, the logic circuit 120 may include a row driver 121, a switching circuit 122, an analog-to-digital converter (ADC) 124, a buffer circuit 126, a latch circuit 127, and a column decoder 128.

In response to a row select signal, the row driver 121 activates at least one row of the pixel array 110. In response to a column select signal, the column decoder 128 is enabled in the column direction of the pixel array 110 to read out a pixel value from each pixel.

The switching circuit 122 switches a connection between adjacent columns in a unit kernel. The ADC 124 converts a current value, from analog to digital, read out along each column of the pixel array 110 switched according to the switching circuit 122, and stores the current value in the buffer circuit 126.

According to some embodiments, the switching circuit 122 may include a plurality of switches. For example, according to some embodiments, switching circuits 122-1 and 122-2 may operate in units of the unit kernel. As a specific example, it is assumed that each of the unit kernels K1 and K2 includes specific pixels, which are indicated by hatched regions in the pixel array 110.

When the first binning of FIG. 4 is performed, the switching circuit 122-1 may turn G1 and G2 on and turn G3 off at a timing (0-T1), and may turn G1 and G2 off and turn G3 on at a timing (T1-T2). Similarly, the switching circuit 122-1 may turn G5 and G6 on and turn G4 off at the timing (0-T1), and may turn G5 and G6 off and turn G4 on at the timing (T1-T2).

When the first binning of FIG. 5 is performed, the switching circuit 122-1 may simultaneously turn G1, G2, and G3 on at the timing (0-T1), and the switching circuit 122-2 may simultaneously turn G4, G5, and G6 on at the timing (0-T1).

As described above, when each column in the unit kernel is switched, the ADC 124 sums current values received along the switched output lines and perform an analog-to-digital conversion. In this case, since the row driver 121 enables all rows belonging to one unit kernel, the first binning may be performed on three color pixel values belonging to one column through the switching circuit 122 and the ADC 124. However, when specific pixels are present, the first binning may be performed on two specific pixel values by differentiating from the color pixels.

In summary, when the pixel values with respect to the raw image are read out from the pixel array 110, the first binning is performed on the raw image by the switching circuit 122 and the ADC 124 in units of the unit kernel.

As shown in FIG. 7, according to some embodiments, the ADC 124 may include a first ADC 124-1 and a second ADC 124-2 connected to all of the plurality of columns in the unit kernel.

Alternatively, as shown in FIG. 8, according to some embodiments, the ADC 124 may include a plurality of first and second ADCs 124 separated and connected to each column. That is, in the N×N sub-arrays, the number of ADCs may be N corresponding to the number of columns (N is a natural number equal to two or more).

When the first binning is completed and the latch circuit 127 is latched, the first binned image Data Out stored in the buffer circuit 126 is output to the application processor 1200.

Referring to FIG. 9, the buffer circuit 126 separates and stores the first binned image into color pixel values and specific pixel values. For example, the first binned image includes first binned color pixel values Color Data and first binned specific pixel values Tail, and the first binned specific pixel values is stored in the buffer circuit 126 as tails of the first binned color pixel values. In the case of a row in which the specific pixel does not belong, the tails may be set to preset values (e.g., Null) and stored.

The latch circuit 127 serially outputs the first binned image stored in the buffer circuit 126. For example, the latch circuit 127 latches the rows stored in the buffer circuit 126 to output the rows in the order of ①→②→③ and may serially output the rows in the order of Color Data 1, Tail 1, Color Data 2, Tail 2, Color data 3, and Tail 3.

Subsequently, the second memory 220 may store the first binned image serially output from the image sensor 1500, and the processing unit 210 may perform the second binning based on the first binned image from the second memory 220.

Figure 10B:
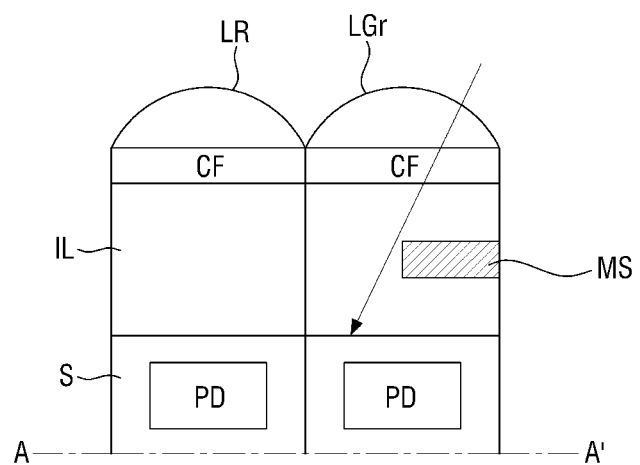
Figure 10C:
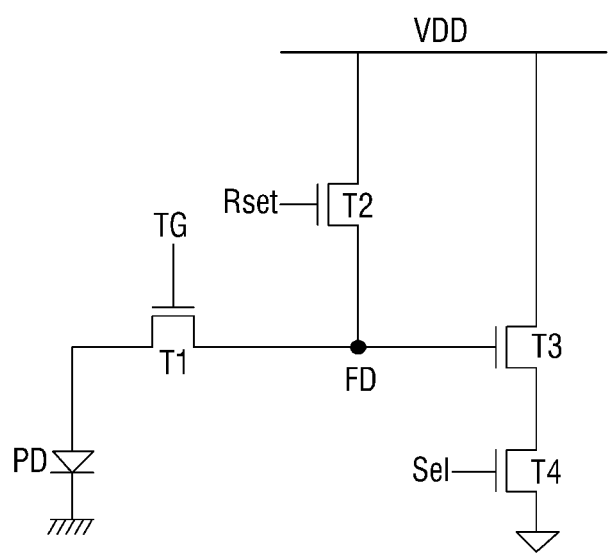

FIGS. 10a to 10c illustrate a pixel structure according to some embodiments. FIG. 10b is a cross-sectional view of the pixel structure of FIG. 10a taken along line A-A'.

According to some embodiments, color pixels or unit kernels may be disposed in a Bayer pattern, and one microlens LR, LGr, LGb, or LB may be disposed in each pixel.

Referring to FIGS. 10a and 10b, a unit pixel may include a photodiode formed on a substrate S, and a metal wiring, multi-layer wiring, or wiring layer IL formed on the photodiode. The wiring layer IL may include a metal structure MS which partially blocks the unit pixel. A color filter array CF is disposed to correspond to the unit pixel on an upper surface of an intermediate insulating layer IL and filters a specific wavelength. According to some embodiments, a lens buffer or a planarization layer may be formed on an upper surface of the color filter array CF. The microlenses LR, LGr, LGb, and LB corresponding to a size of the unit pixel may be disposed on the upper surface of the planarization layer.

The specific pixel blocks a portion of the photodiode PD with the metal structure MS and detects only light incident on a portion thereof which is not blocked by the metal structure MS. A phase difference may be detected using a pixel which is blocked by the metal structure MS and a pixel which is not blocked thereby, for example, an R pixel and a Gr pixel.

Referring to FIG. 10c, according to some embodiments, a unit pixel may include a photodiode PD, a transfer transistor T1, a floating diffusion region FD, a reset transistor T2 to which a reset signal Rset is applied, a readout transistor T3, and a row select transistor T4 to which a row select signal Sel is applied. The floating diffusion region FD may temporarily store charges generated in the photodiode PD until being reset by the reset transistor T2. When the row select transistor T4 is turned on in response to a row select signal, the charges stored in the floating diffusion region FD may be read out. According to various embodiments, the photodiode PD may include, for example, a pin photodiode, a photogate, or other photodetection elements.

Referring to FIGS. 10b and 10c, to describe an operation of the unit pixel, the reset transistor T2 resets the remaining charges previously stored in the floating diffusion region FD to a predetermined level. Thereafter, the photodiode PD accumulates photoelectrically converted charges corresponding to incident light and transfers the accumulated charges to the floating diffusion region FD through the transfer transistor T1. When the row select transistor T4 is turned on, the charges accumulated in the floating diffusion region FD are read out through the readout transistor T3, and thus, a corresponding voltage is output to an output line. According to an embodiment, with the above principle, each of an R pixel and a Gr pixel may be enabled by a row driver and a column decoder to detect phase information not covered with the metal structure MS and phase information covered therewith, thereby detecting a phase difference.

In the illustrated embodiment, a case in which the unit pixel is implemented with four transistors is described. However, embodiments of the present disclosure are not limited thereto. For example, according to some embodiments, the unit pixel may be implemented with three or five transistors, and according to some embodiments, one floating diffusion region may be shared by a plurality of photodiodes. Alternatively, according to some embodiments, the reset transistor T2 or the readout transistor T3 may be shared by a plurality of photodiodes, a plurality of transfer transistors, and a plurality of floating diffusion regions.

Figure 11A:
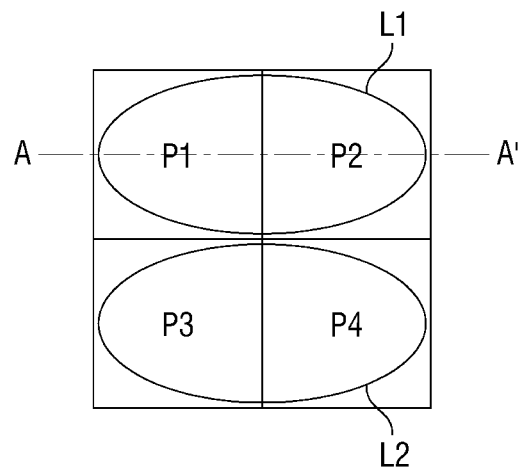
FIGS. 11a to 11c illustrate a pixel structure according to some embodiments.
Figure 11B:
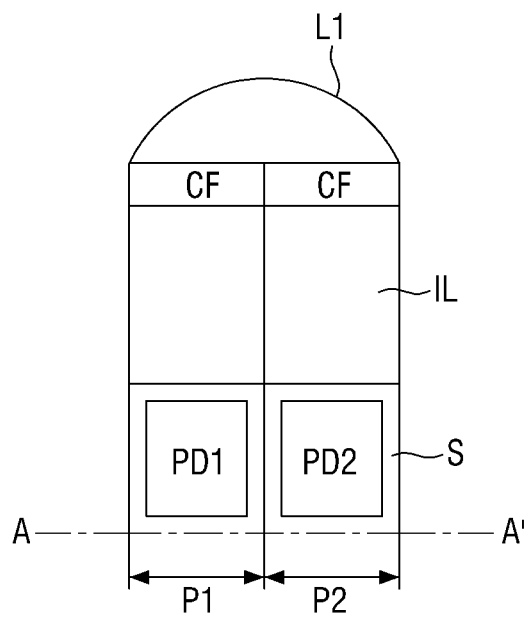
Figure 11C:
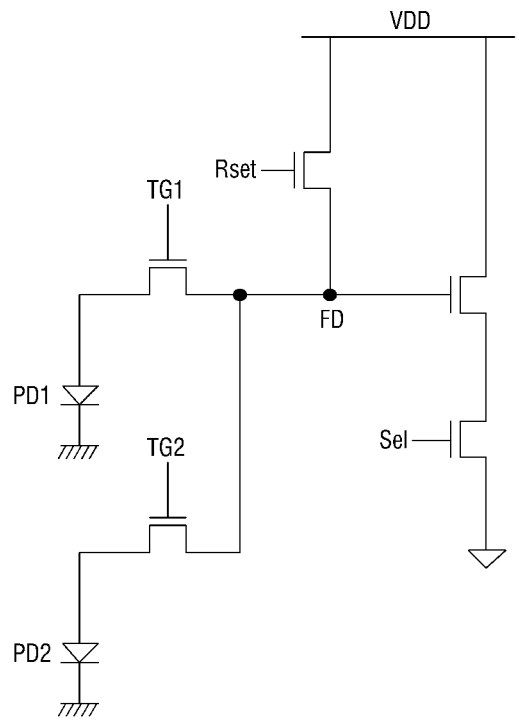

FIGS. 11a to 11c illustrate a pixel structure according to some embodiments. FIG. 11b is a cross-sectional view of the pixel structure of FIG. 11a taken along line A-A'. For convenience of description, differences from FIGS. 10a to 10c will be mainly described, and a further description of elements and technical aspects previously described may be omitted.

Unlike FIG. 10a, referring to FIG. 11a, one microlens may correspond to two photodiodes PD1 and PD2. The two photodiodes PD1 and PD2 may mean R pixels, G pixels, or B pixels in some embodiments, or may mean the same color pixels or the same specific pixels in the unit kernel in some embodiments.

Referring to FIG. 11b, the two photodiodes PD1 and PD2 may be formed on a substrate S, and a deep trench isolation (DTI) may be formed between the two photodiodes PD1 and PD2. Wiring layers may be formed between the photodiodes PD1 and PD2 and color filters CF. However, unlike FIG. 10b, a metal structure is not included in the wiring layer.

According to some embodiments, the photodiodes PD1 and PD2 may be adjacent photodiodes which have the same exposure time and in which transfer signals TG1 and TG2 are turned on at different timings, or may be photodiodes designed to have different exposure times.

Referring to FIG. 11c, according to some embodiments, the two photodiodes PD1 and PD2 share one floating diffusion region FD. That is, the unit pixel includes the two photodiodes PD1 and PD2, two transfer transistors (to which the transfer signals TG1 and TG2 are applied), a reset transistor, a readout transistor, and a row select transistor. Alternatively, unlike that shown in the drawing, according to some embodiments, the two photodiodes PD1 and PD2 do not share the floating diffusion region FD.

Figure 12A:
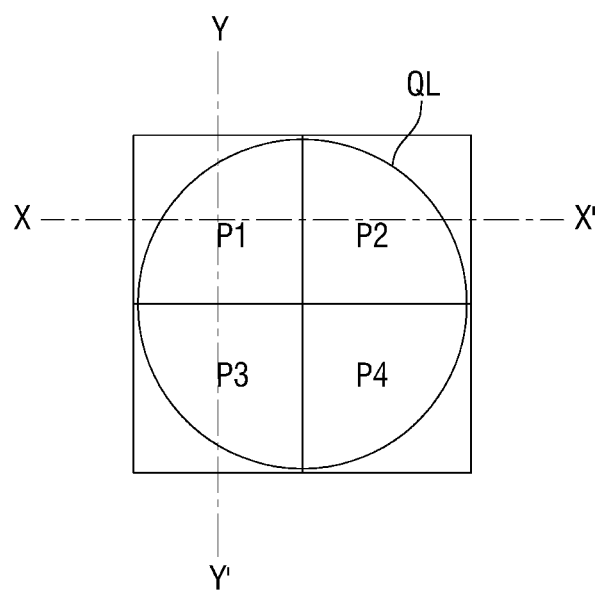
FIGS. 12a to 12d illustrate a pixel structure according to some embodiments.
Figure 12B:
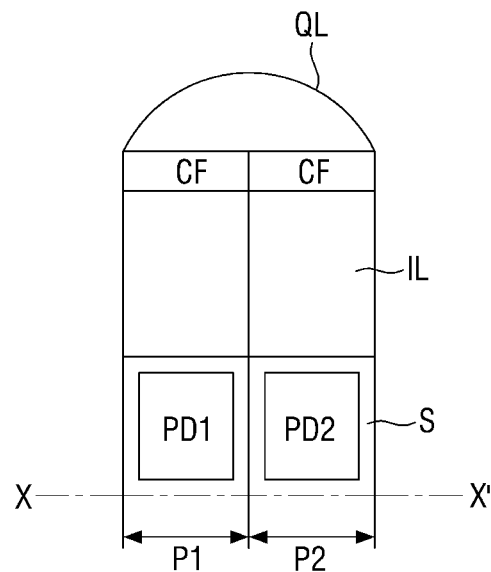
Figure 12C:
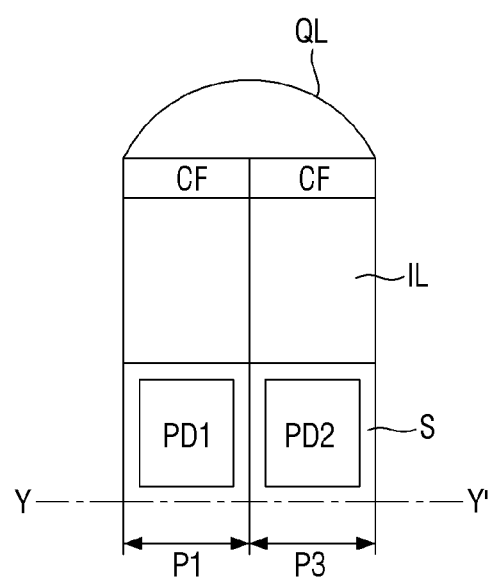

FIGS. 12a to 12d illustrate a pixel structure according to some embodiments. FIG. 12b is a cross-sectional view of the pixel structure of FIG. 12a taken along line X-X', and FIG. 12c is a cross-sectional view of the pixel structure of FIG. 12a taken along line Y-Y'. For convenience of description, differences from FIGS. 10a to 10c will be mainly described, and a further description of elements and technical aspects previously described may be omitted.

Unlike FIG. 10a, referring to FIG. 12a, one microlens QL may correspond to four photodiodes PD1, PD2, PD3, and PD4. The four photodiodes PD1, PD2, PD3, and PD4 may correspond to R pixels, G pixels, or B pixels in some embodiments, or may correspond to the same color pixels or the same specific pixels in the unit kernel in some embodiments.

Referring to FIGS. 12b and 12c, the four photodiodes PD1, PD2, PD3, and PD4 may be formed in the form of a 2×2 array on a substrate S, and a DTI may be formed between the four photodiodes PD1, PD2, PD3, and PD4. Wiring layers IL may be formed between the photodiodes PD1 and PD2 and color filters CF. However, unlike FIG. 10b, a metal structure is not included in the wiring layers IL.

According to some embodiments, the photodiodes PD1, PD2, PD3, and PD4 may be adjacent photodiodes which have the same exposure time and in which transfer signals TG1, TG2, TG3, and TG4 are turned on at different timings or may be photodiodes designed to have different exposure times.

Figure 12D:
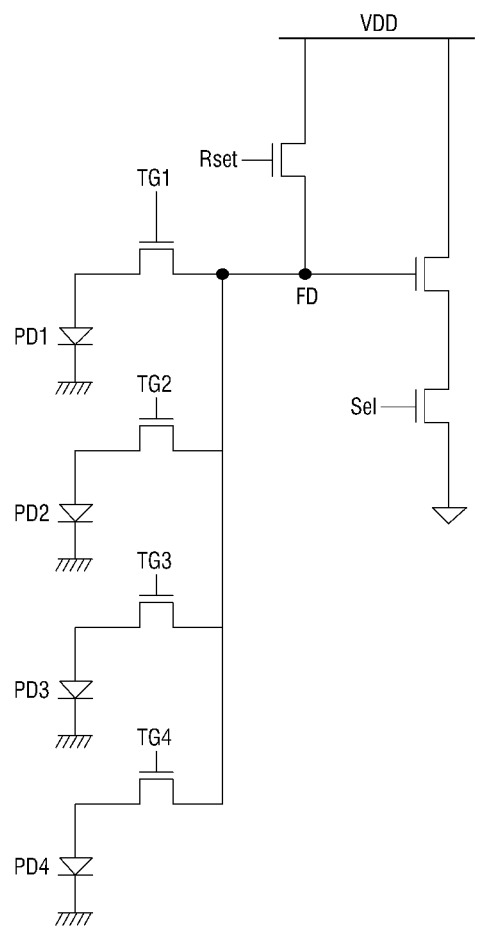

Referring to FIG. 12d, according to some embodiments, the four photodiodes PD1, PD2, PD3, and PD4 share one floating diffusion region FD. That is, the unit pixel includes the four photodiodes PD1, PD2, PD3, and PD4, four transfer transistors (to which the transfer signals TG1, TG2, TG3, and TG4 are applied), a reset transistor, a readout transistor, and a row select transistor. Alternatively, unlike that shown in FIG. 12d, the four photodiodes PD1, PD2, PD3, and PD4 do not share the floating diffusion region FD in some embodiments, or the at least two transfer transistors may share a portion of the floating diffusion region FD in some embodiments.

Figure 13:
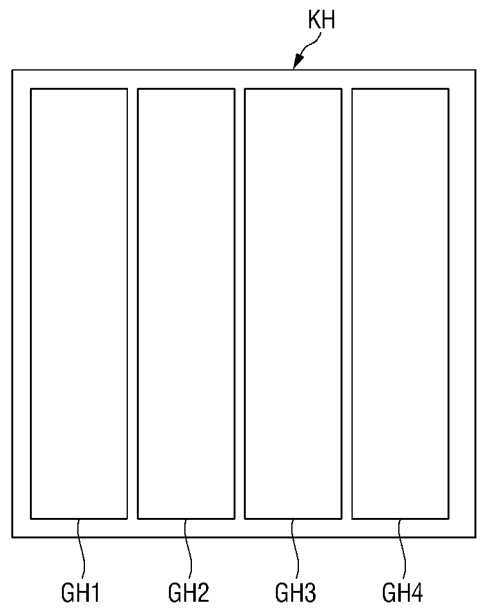
FIG. 13 illustrates a unit kernel of a pixel array according to some embodiments.

FIG. 13 illustrates a unit kernel of a pixel array according to some embodiments.

According to some embodiments, the unit kernel KH, which is an N×N sub-array (N is a natural number of two or more), may include N sub-groups corresponding to columns Referring to FIG. 13, in an embodiment, a unit kernel KH may be a 4×4 sub-array, and in this case, the unit kernel KH may include sub-groups GH1, GH2, GH3, and GH4.

In the case of an embodiment of FIG. 13, the first binning of FIGS. 4 to 6 may be performed in units of each of the sub-groups GH1, GH2, GH3, and GH4.

For example, according to some embodiments, the image sensor 1500 may read out each of the sub-groups GH1, GH2, GH3, and GH4 at the same timing to perform the first binning on the sub-groups GH1, GH2, GH3, and GH4. Alternatively, according to some embodiments, the image sensor 1500 may read out a sub-group including specific pixels among the sub-groups GH1, GH2, GH3, and GH4 at a timing different from timings of the remaining sub-groups to perform the first binning on the readout sub-group. Alternatively, according to some embodiments, the image sensor 1500 may read out at least one sub-group not including specific pixels among the sub-groups GH1, GH2, GH3, and GH4 at a timing different from timings of the remaining sub-groups to perform the first binning on the readout sub-group. Alternatively, according to some embodiments, the image sensor 1500 may read out the sub-groups GH1, GH2, GH3, and GH4 at different timings to perform the first binning on the sub-groups GH1, GH2, GH3, and GH4.

That is, in addition to a case in which the unit kernel is a 3×3 sub-array, the present disclosure is applicable to sub-arrays having a variety of sizes.

Figure 14:
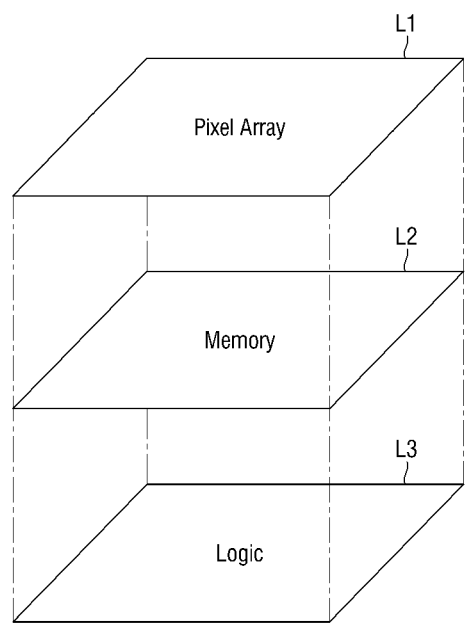
FIGS. 14 and 15 are diagrams illustrating the image sensor shown in FIG. 1 according to some embodiments.
Figure 15:
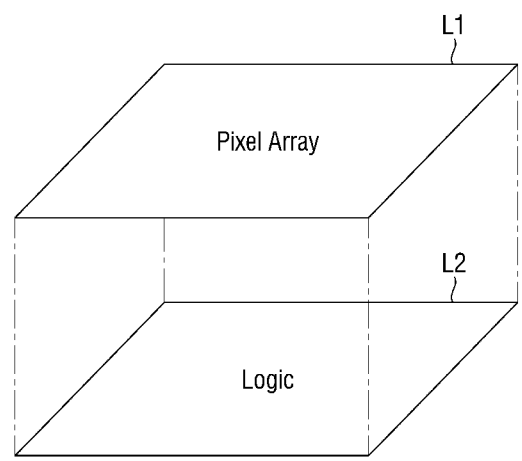

FIGS. 14 and 15 are diagrams illustrating the image sensor shown in FIG. 1 according to some embodiments.

Referring to FIGS. 14 and 15, the image sensor 1500 may be implemented as a plurality of stacked layers.

Referring to FIG. 14, according to some embodiments, the pixel array 110 may be implemented in a first layer L1, the first memory 130 may be implemented in a second layer L2, and the logic circuit 120 may be implemented in a third layer L3. Alternatively, according to some embodiments, the pixel array 110 may be implemented in the first layer L1, the logic circuit 120 may be implemented in the second layer L2, and the first memory 130 may be implemented in the third layer L3. That is, the pixel array 110, the logic circuit 120, and the first memory 130 may be formed in different layers and stacked.

Referring to FIG. 15, according to some embodiments, the pixel array 110 may be implemented in the first layer L1, and the logic circuit 120 may be implemented in the second layer L2. Alternatively, according to some embodiments, the second layer L2 may further include the first memory 130 in addition to the logic circuit 120.

According to some embodiments, the layers of FIGS. 14 and 15 may include a plurality of pad regions provided around the layers. Pads of each layer may be connected to pads of other layers through vias or the like. According to some embodiments, the pads may be disposed to be divided into input interface pads and output interface pads or disposed according to functions, or interface pads may be disposed without input/output discrimination.

Figure 16:
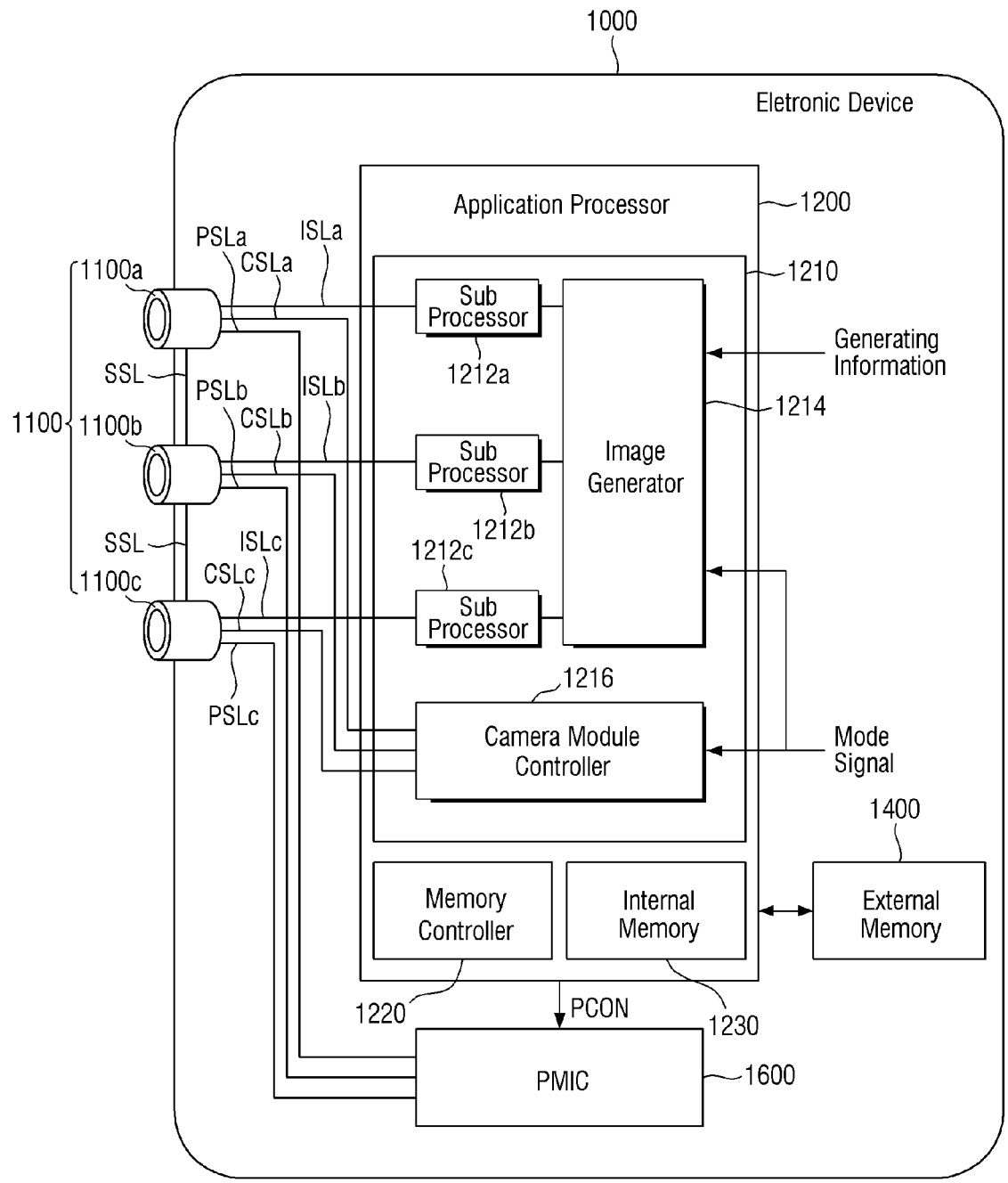
FIG. 16 is a block diagram illustrating an electronic device including a multi-camera module according to some embodiments.
Figure 17:
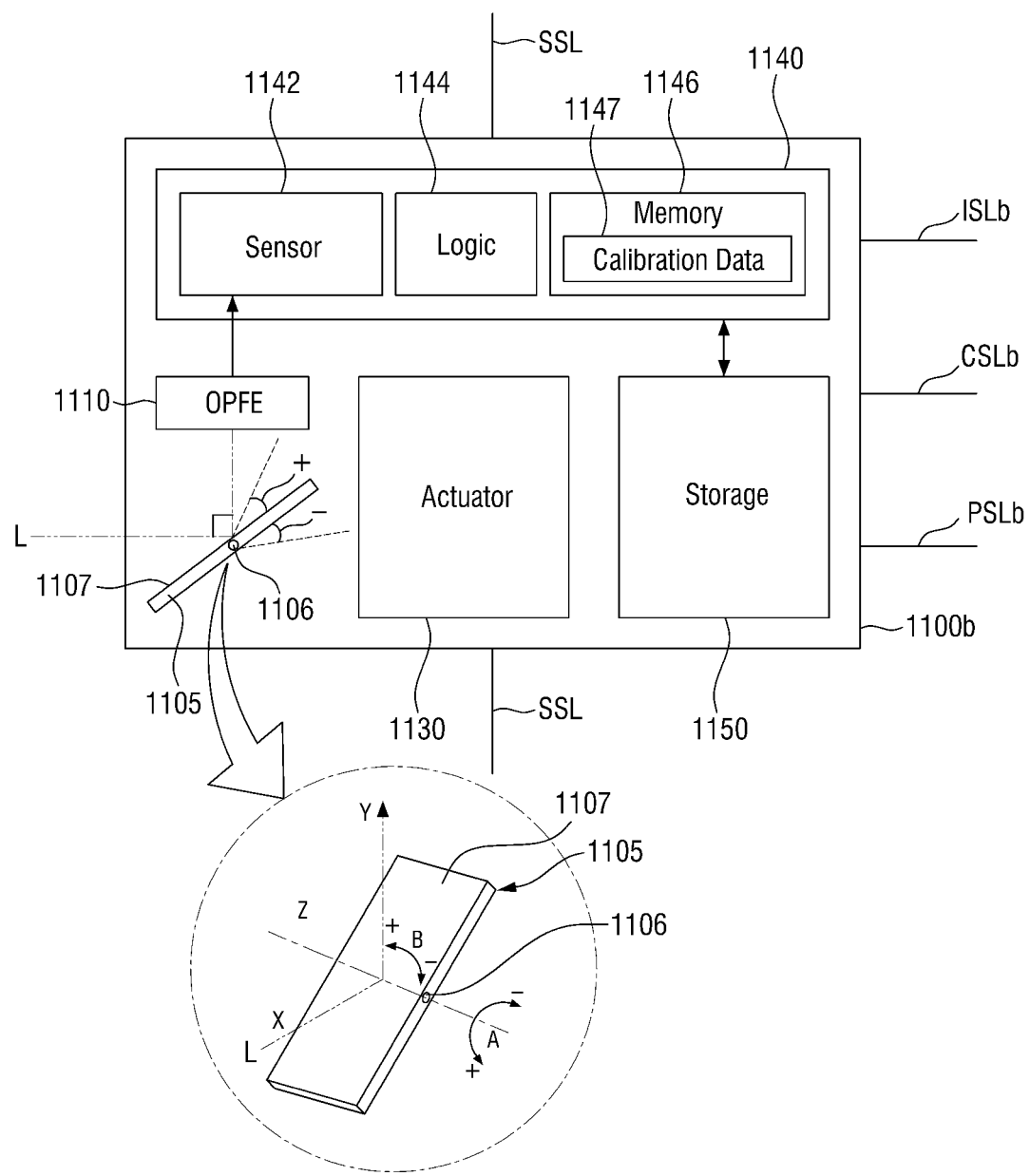
FIG. 17 is a detailed block diagram illustrating the camera module of FIG. 16 according to some embodiments.

FIG. 16 is a block diagram illustrating an electronic device including a multi-camera module according to some embodiments. FIG. 17 is a detailed block diagram illustrating the camera module of FIG. 16 according to some embodiments.

Referring to FIG. 16, an electronic device 1000 may include a camera module group 1100, an application processor 1200, a power management integrated circuit (PMIC) 1600, and an external memory 1400.

The camera module group 1100 may include a plurality of camera modules 1100a, 1100b, and 1100c. Although an embodiment in which three camera modules 1100a, 1100b, and 1100c are disposed is illustrated in FIG. 16, embodiments are not limited thereto. For example, in some embodiments, the camera module group 1100 may be modified and implemented to include only two camera modules. In addition, in some embodiments, the camera module group 1100 may be modified and implemented to include n camera modules (n is a natural number equal to 4 or more).

Hereinafter, a configuration of the camera module 1100b will be described in more detail with reference to FIG. 17. It is to be understood that the following description may be applied to other camera modules 1100a and 1100c according to embodiments.

Referring to FIG. 17, the camera module 1100b may include a prism 1105, an optical path folding element (OPFE) 1110, an actuator 1130, an image sensing device 1140, and a storage 1150.

The prism 1105 may include a reflective surface 1107 made of a light reflective material that changes a path of light L entering from outside the camera module 1100b.

In some embodiments, the prism 1105 may change a path of the light L entering in a first direction X to a path in a second direction Y perpendicular to the first direction X. In addition, the prism 1105 may rotate the reflective surface 1107 made of a light reflective material in a direction A around a central axis 1106 or rotate the central axis 1106 in a direction B to change the path of the light entering in the first direction X to the path in the second direction Y perpendicular to the first direction X. In this case, the OPFE 1110 may also be moved in a third direction Z perpendicular to the first direction X and the second direction Y.

In some embodiments, as shown in FIG. 17, a maximum rotation angle in the direction A of the prism 1105 may be less than or equal to about 15 degrees in a positive (+) direction A and may be greater than about 15 degrees in a negative (−) direction A. However, embodiments are not limited thereto.

In some embodiments, the prism 1105 may be moved about 20 degrees, moved in the range of about 10 degrees to about 20 degrees, or moved in the range of about 15 degrees to about 20 degrees in a positive (+) or negative (−) direction B. Here, the prism 1105 may be moved at about the same angle in the positive (+) and negative (−) directions B or moved at a substantially similar angle in the range of about one degree in the positive (+) and negative (−) directions B.

In some embodiments, the prism 1105 may move the reflective surface 1107 made of a light reflective material in a third direction (e.g., the third direction Z) parallel to an extending direction of the central axis 1106.

For example, the OPFE 1110 may include optical lenses formed of m groups (m is a natural number). The m optical lenses may be moved in the second direction Y to change an optical zoom ratio of the camera module 1100b. For example, when a default optical zoom ratio of the camera module 1100b is Z and the m optical lenses included in the OPFE 1110 are moved, the optical zoom ratio of the camera module 1100b may be changed to 3Z, 5Z, or more than 5Z.

The actuator 1130 may move the OPFE 1110 or the optical lens (hereinafter referred to as an optical lens) to a specific position. For example, for accurate sensing, the actuator 1130 may adjust a position of the optical lens to locate an image sensor 1142 at a focal length of the optical lens.

The image sensing device 1140 may include an image sensor 1142, a control logic 1144, and a memory 1146. The image sensor 1142 may sense an image of a sensing target using light L provided through the optical lens. The control logic 1144 may control an overall operation of the camera module 1100b. For example, the control logic 1144 may control the operation of the camera module 1100b in response to a control signal provided through a control signal line CSLb.

The memory 1146 may store information such as, for example, calibration data 1147 utilized for the operation of the camera module 1100b. The calibration data 1147 may include information utilized for the camera module 1100b to generate image data using the light L provided from outside the camera module 1100b. For example, the calibration data 1147 may include information on the degree of rotation, the focal length, the optical axis, and the like, which are described above. When the camera module 1100b is implemented in the form of a multi-state camera of which a focal length is varied according to positions of the optical lenses, the calibration data 1147 may include a focal length value for each position (or each state) of the optical lenses and information related to auto focusing.

The storage 1150 may store image data sensed through the image sensor 1142. The storage 1150 may be disposed outside the image sensing device 1140 and implemented in the form of being stacked with a sensor chip constituting the image sensing device 1140. In some embodiments, the storage 1150 may be implemented as an EEPROM. However, embodiments are not limited thereto.

Referring to FIGS. 16 and 17, in some embodiments, each of the plurality of camera modules 1100a, 1100b, and 1100c may include the actuator 1130. Thus, the plurality of camera modules 1100a, 1100b, and 1100c may include pieces of calibration data 1147 which are equal to or different from each other according to an operation of the actuator 1130 included in each of the plurality of camera modules 1100a, 1100b, and 1100c.

In some embodiments, one camera module (e.g., 1100b) among the plurality of camera modules 1100a, 1100b, and 1100c may be in the form of a folded lens including the prism 1105 and the OPFE 1110, which are described above, and the remaining camera modules (e.g., 1100a and 1100c) may be vertical type camera modules in which the prism 1105 and the OPFE 1110 are not included. However, embodiments are not limited thereto.

For example, in some embodiments, one camera module (e.g., 1100c) among the plurality of camera modules 1100a, 1100b, and 1100c may be a vertical type depth camera which extracts depth information using an infrared (IR) ray. In this case, the application processor 1200 may merge image data provided from such a depth camera with image data provided from another camera module (e.g., 1100a or 1100b) to generate a three-dimensional (3D) depth image.

In some embodiments, at least two camera modules (e.g., 1100a and 1100b) among the plurality of camera modules 1100a, 1100b, and 1100c may have different field of views (different viewing angles). In this case, for example, the optical lenses of at least two camera modules (e.g., 1100a and 1100b) among the plurality of camera modules 1100a, 1100b, and 1100c may be different from each other. However, embodiments of the present disclosure are not limited thereto.

Further, in some embodiments, viewing angles of the plurality of camera modules 1100a, 1100b, and 1100c may be different from each other. In this case, the optical lenses included in the plurality of camera modules 1100a, 1100b, and 1100c may also be different from each other. However, embodiments of the present disclosure are not limited thereto.

In some embodiments, the plurality of camera modules 1100a, 1100b, and 1100c may be disposed to be physically separated from each other. That is, instead of the sensing area of one image sensor 1142 being divided and used by the plurality of camera modules 1100a, 1100b, and 1100c, in some embodiments, an independent image sensor 1142 may be disposed in each of the plurality of camera modules 1100a, 1100b, and 1100c.

Referring again to FIG. 16, the application processor 1200 may include an image processing device 1210, a memory controller 1220, and an internal memory 1230. The application processor 1200 may be separately implemented from the plurality of camera modules 1100a, 1100b, and 1100c. For example, the application processor 1200 may be separately implemented from the plurality of camera modules 1100a, 1100b, and 1100c as a separate semiconductor chip.

The image processing device 1210 may include a plurality of sub-image processors 1212a, 1212b, and 1212c, an image generator 1214, and a camera module controller 1216.

The image processing device 1210 may include the plurality of sub-image processors 1212a, 1212b, and 1212c of which the number corresponds to the number of the plurality of camera modules 1100a, 1100b, and 1100c.

Image data generated from each of the camera modules 1100a, 1100b, and 1100c may be provided to the corresponding sub-image processors 1212a, 1212b, and 1212c through image signal lines ISLa, ISLb, and ISLc which are separated from each other. For example, image data generated from the camera module 1100a may be provided to the sub-image processor 1212a through the image signal line ISLa, image data generated from the camera module 1100b may be provided to the sub-image processor 1212b through the image signal line ISLb, and image data generated from the camera module 1100c may be provided to the sub-image processor 1212c through the image signal line ISLc. For example, such image data transmission may be performed using a camera serial interface (CSI) based on a mobile industry processor interface (MIPI). However, embodiments are not limited thereto.

In some embodiments, one sub-image processor may be disposed to correspond to a plurality of camera modules. For example, instead of the sub-image processor 1212a and the sub-image processor 1212c being separately implemented from each other as shown in FIG. 16, the sub-image processor 1212a and the sub-image processor 1212c may be implemented by being integrated into one sub-image processor, and the image data provided from the camera module 1100a and the camera module 1100c may be selected through a selection element (for example, a multiplexer) and then provided to the integrated sub-image processor.

The image data provided to each of the sub-image processors 1212a, 1212b, and 1212c may be provided to the image generator 1214. The image generator 1214 may generate an output image using the image data provided from each of the sub-image processors 1212a, 1212b, and 1212c according to image generating information or a mode signal.

For example, according to the image generating information or the mode signal, the image generator 1214 may generate an output image by merging at least some pieces of the image data generated from the camera modules 1100a, 1100b, and 1100c having different viewing angles. Alternatively, according to the image generating information or the mode signal, the image generator 1214 may generate an output image by selecting any one piece of the image data generated from the camera modules 1100a, 1100b, and 1100c having different viewing angles.

In some embodiments, the image generating information may include, for example, a zoom signal or a zoom factor. Further, in some embodiments, for example, the mode signal may be a signal based on a mode which is selected by a user.

When the image generating information is a zoom signal (zoom factor) and the camera modules 1100a, 1100b, and 1100c have different field of views (different viewing angles), the image generator 1214 may perform different operations according to the types of zoom signals. For example, when the zoom signal is a first signal, the image data output from the camera module 1100a may be merged with the image data output from the camera module 1100c, and then an output image may be generated using the merged image signal and the image data output from the camera module 1100b, which is not used in the merging. When the zoom signal is a second signal different from the first signal, in some embodiments, the image generator 1214 does not perform such image data merging and may select any one of the image data output from the camera module 1100a, 1100b, and 1100c to generate an output image. However, embodiments are not limited thereto.

In some embodiments, the image generator 1214 may receive a plurality of pieces of image data having different exposure times from at least one among the plurality of sub-image processors 1212a, 1212b, and 1212c, and may perform a high dynamic range (HDR) process on the plurality of pieces of image data to generate merged image data with an increased dynamic range.

The camera module controller 1216 may provide a control signal to each of the camera modules 1100a, 1100b, and 1100c. The control signals generated from the camera module controller 1216 may be provided to the corresponding camera modules 1100a, 1100b, and 1100c through control signal lines CSLa, CSLb, and CSLc which are separated from each other.

Any one among the plurality of camera modules 1100a, 1100b, 1100c may be designated as a master camera (e.g., 1100b) according to the image generating information including a zoom signal or the mode signal, and the remaining camera modules (e.g., 1100a and 1100c) may be designated as slave cameras. Such information may be included in the control signals and provided to the corresponding camera modules 1100a, 1100b, and 1100c through the control signal lines CSLa, CSLb, and CSLc which are separated from each other.

The camera modules operating as masters and slaves may be changed according to a zoom factor or an operation mode signal. For example, when the viewing angle of the camera module 1100a is greater than the viewing angle of the camera module 1100b and the zoom factor indicates a low zoom magnification, the camera module 1100b may operate as a master, and the camera module 1100a may operate as a slave. In contrast, when the zoom factor indicates a high zoom magnification, the camera module 1100a may operate as a master and the camera module 1100b may operate as a slave.

In some embodiments, the control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving the sync enable signal may generate a sync signal based on the received sync enable signal and transmit the generated sync signal to the camera modules 1100a and 1100c through sync signal lines SSL. The camera module 1100b and the camera modules 1100a and 1100c may be synchronized with the sync signal to transmit image data to the application processor 1200.

In some embodiments, control signals provided from the camera module controller 1216 to the plurality of camera modules 1100a, 1100b, and 1100c may include mode information according to a mode signal. On the basis of the mode information, the plurality of camera modules 1100a, 1100b, and 1100c may operate in a first operation mode and a second operation mode in relation to a sensing speed.

In the first operation mode, the plurality of camera modules 1100a, 1100b, and 1100c may generate an image signal at a first rate (for example, an image signal at a first frame rate), encode the image signal at a second rate that is higher than the first rate (for example, the image signal is encoded at a second frame rate that is higher than the first frame rate), and transmit the encoded image signal to the application processor 1200. In this case, the second rate may be about thirty times or less than the first rate according to some embodiments.

The application processor 1200 may store the received image signal, that is, the encoded image signal, in the internal memory 1230 provided in the application processor 1200 or in the external memory 1400 disposed outside the application processor 1200, read out and decode the encoded image signal from the internal memory 1230 or the external memory 1400, and display image data generated based on the decoded image signal. For example, a corresponding sub-image processor among the plurality of sub-image processor 1212a, 1212b, and 1212c of the image processing device 1210 may perform decoding and may also perform image processing on the decoded image signal.

In the second operation mode, each of the plurality of camera modules 1100a, 1100b, and 1100c may generate an image signal at a third rate that is lower than the first rate (e.g., an image signal having a third frame rate that is lower than the first frame rate) and transmit the image signal to the application processor 1200. The image signal provided to the application processor 1200 may be a signal on which encoding is not performed. The application processor 1200 may perform image processing on the received image signal or may store the received image signal in the internal memory 1230 or the external memory 1400.

The PMIC 1600 may supply power, for example, a power supply voltage, to each of the plurality of camera modules 1100a, 1100b, and 1100c. For example, under the control of the application processor 1200, the PMIC 1600 may supply first power to the camera module 1100a through a power signal line PSLa, second power to the camera module 1100b through a power signal line PSLb, and third power to the camera module 1100c through power signal line PSLc.

In response to a power control signal PCON received from the application processor 1200, the PMIC 1600 may generate power corresponding to each of the plurality of camera modules 1100a, 1100b, and 1100c and may also adjust a level of power. The power control signal PCON may include a power adjustment signal for each operation mode of the plurality of camera modules 1100a, 1100b, and 1100c. For example, the operation mode may include a low power mode. In this case, the power control signal PCON may include information on a camera module operating in the low power mode and a set level of power. Levels of power provided to the plurality of camera modules 1100a, 1100b, and 1100c may be the same or different from each other. In addition, the level of power may be dynamically varied.

While the present disclosure has been particularly shown and described with reference to the embodiments thereof, it will be understood by those of ordinary skill in the art that various changes in form and detail may be made therein without departing from the spirit and scope of the present disclosure as defined by the following claims.

What is claimed is:

1. An electronic device, comprising:
a pixel array configured to output a raw image including a plurality of color pixels and a plurality of specific pixels;
a logic circuit configured to output a first binned image by performing first binning on pixels among the color pixels and the specific pixels in a column direction for each of a plurality of unit kernels of the raw image; and
a processor configured to output a second binned image by performing second binning on the first binned image,
wherein, when a unit kernel among the unit kernels includes at least one of the specific pixels, a column to which the at least one specific pixel belongs is read out at a readout timing different from a readout timing of a column to which none of the specific pixels belong and undergoes the first binning, and
the second binning combines a binned color pixel value of the column to which none of the specific pixels belong with a corrected color pixel value of the column to which the at least one specific pixel belongs,
wherein the processor generates the binned color pixel value by performing binning on color pixels of the column to which none of the specific pixels belong in a row direction, and generates the corrected color pixel value by correcting the column to which the at least one specific pixel belongs to an adjacent color pixel value in the row direction, wherein the first binned image of the column to which the at least one specific pixel belongs includes the corrected color pixel value.

2. The electronic device of claim 1, wherein
the unit kernel includes a first type column and a second type column as an N×N sub-array with respect to a same color pixel among the color pixels in the pixel array,
N is a natural number equal to two or more,
the first type column includes N same color pixels among the color pixels, and
the second type column includes at least one of the specific pixels.

3. The electronic device of claim 2, wherein the logic circuit comprises:
at least one switching circuit connected to the N×N sub-array and configured to switch each column;
at least one analog-to-digital converter (ADC) configured to perform the first binning on a switched row;
a buffer circuit connected to the at least one ADC and configured to store the first binned color pixel value and the first binned specific pixel value as the first binned image; and
a latch circuit configured to output the first binned image.

4. The electronic device of claim 3, wherein the at least one ADC performs the first binning on the first type column at a first readout timing and performs the first binning on the second type column at a second readout timing according to a column select signal and an operation of the at least one switching circuit.

5. The electronic device of claim 3, wherein the at least one ADC includes N ADCs which are connected to columns of the N×N sub-array.

6. The electronic device of claim 3, wherein the at least one ADC includes only one ADC which is connected to all columns of the N×N sub-array.

7. The electronic device of claim 3, wherein the at least one ADC performs the first binning on columns at different readout timings according to a column select signal and an operation of the at least one switching circuit, and stores the first binned color pixel value and the first binned specific pixel value in the buffer circuit.

8. An electronic device, comprising:
an image sensor; and
an application processor,
wherein the image sensor comprises:
a pixel array in which a plurality of unit kernels is disposed in a Bayer pattern and which generates a raw image; and
a logic circuit configured to access the pixel array, perform first binning on the raw image in a column direction, and output a first binned image,
wherein the plurality of unit kernels includes an N×N sub-array including a plurality of same color pixels,
N is a natural number equal to two or more, and
at least one unit kernel among the plurality of unit kernels includes a specific pixel in at least one column, and
the application processor comprises:
a memory configured to store a first binned color pixel value and a first binned specific pixel value in units of the unit kernel; and
a processor configured to output a second binned color pixel value by performing second binning on the first binned color pixel value and the first binned specific pixel value,
wherein the processor generates a first binned corrected color pixel value with respect to a column to which the specific pixel belongs based on an adjacent color pixel, performs the second binning on the first binned color pixel value in the unit kernel and the first binned corrected color pixel value in a row direction, and outputs a second binned image including the second binned color pixel value and the first binned specific pixel value.

9. The electronic device of claim 8, wherein the memory continuously stores the first binned color pixel value and stores the first binned specific pixel value as a tail with respect to one column of the unit kernel belonging to the pixel array.

10. The electronic device of claim 8, wherein the logic circuit comprises:
at least one switching circuit connected to the N×N sub-array and configured to switch each column;
at least one analog-to-digital converter (ADC) configured to perform the first binning on a switched column;
a buffer circuit connected to the at least one ADC and configured to store a first binned pixel value for each column; and
a latch circuit configured to output the first binned pixel value.

11. The electronic device of claim 10, wherein the at least one switching circuit switches to read out columns of the N×N sub-array at different timings.

12. The electronic device of claim 10, wherein the at least one switching circuit simultaneously switches all columns of the N×N sub-array to be turned on.

13. The electronic device of claim 10, wherein the at least one switching circuit switches at least two first columns of the N×N sub-array to be simultaneously turned on and switches at least one second column to be turned on to be read out at a timing different from timings of the at least two first columns.

14. The electronic device of claim 13, wherein the at least one second column includes the specific pixel.

15. The electronic device of claim 8, wherein one microlens is disposed on an upper surface of each pixel of the pixel array.

16. An image binning method of an electronic device, comprising:
generating, by an image sensor including a pixel array in which a plurality of unit kernels is arranged in a Bayer pattern, a raw image;
performing, by the image sensor, first binning on row pixel values in the raw image, which belong to rows which are turned on at readout timings, and outputting first binned pixel values; and
performing, by a processor, second binning on the first binned pixel values in a row direction and outputting second binned pixel values by combining the first binned pixel values with corrected pixel values,
wherein the first binned pixel values are generated by performing binning on color pixels of a column to which no specific pixels belong in a column direction, and the corrected pixel values are generated by correcting a column to which at least one specific pixel belongs to adjacent color pixel values in a row direction, wherein the plurality of unit kernels includes a plurality of N×N sub-arrays included in a pixel array, N is a natural number equal to two or more, and a readout timing of at least one first column in each of the plurality of unit kernels is different from a second readout timing with respect to a remaining second column.

17. The image binning method of claim 16, wherein at least one unit kernel among the plurality of unit kernels includes a plurality of same color pixels and at least one specific pixel.

18. The image binning method of claim 17, wherein the at least one first column includes the at least one specific pixel, and the remaining second column includes the same color pixels.

19. The image binning method of claim 17, wherein the processor generates a replacement color pixel value with respect to a column to which the at least one specific pixel belongs based on a color pixel adjacent to the at least one specific pixel, generates a second binned color pixel value by performing the second binning based on the first binned pixel values and the replacement color pixel value in a column to which the at least one specific pixel does not belong, and generates a second binned image based on the second binned color pixel value or a first binned specific pixel value.

* * * * *